United States Patent [19]
Asai et al.

[11] Patent Number: 5,717,837
[45] Date of Patent: Feb. 10, 1998

[54] THERMAL PRINTER AND THERMAL PRINTER HEAD DRIVING SYSTEM

[75] Inventors: Tamotsu Asai, Kagoshima-ken; Minoru Suzuki, Tokyo; Kiyoshi Negishi, Tokyo; Katsumi Kawamura, Tokyo; Mikio Horie, Tokyo; Hiroshi Orita, Tokyo; Katsuyoshi Suzuki, Tokyo, all of Japan

[73] Assignee: Asahi Kogaku Kogyo Kabushiki Kaisha, Tokyo, Japan

[21] Appl. No.: 473,918

[22] Filed: Jun. 7, 1995

[30] Foreign Application Priority Data

Jun. 8, 1994 [JP] Japan .................. 6-150304

[51] Int. Cl.$^6$ .................................................. G06F 15/00
[52] U.S. Cl. .................. 395/108; 395/104; 347/181; 347/182; 347/190
[58] Field of Search .................. 395/104, 108; 347/180, 211, 171, 181, 182, 190

[56] References Cited

U.S. PATENT DOCUMENTS

| | | | |
|---|---|---|---|
| 4,500,891 | 2/1985 | Gimel et al. | 395/108 |
| 4,688,051 | 8/1987 | Kawakami et al. | 395/108 |
| 4,761,659 | 8/1988 | Negishi | 346/108 |
| 4,879,459 | 11/1989 | Negishi | 250/205 |
| 5,072,237 | 12/1991 | Takaoka | 395/101 |
| 5,109,255 | 4/1992 | Nishikawa et al. | 355/285 |
| 5,157,761 | 10/1992 | Hawkes | 395/107 |
| 5,381,164 | 1/1995 | Ono | 346/76 PH |
| 5,408,483 | 4/1995 | Kasai et al. | 372/31 |
| 5,424,764 | 6/1995 | Yamaguchi et al. | 347/179 |
| 5,429,441 | 7/1995 | Schulz et al. | 395/108 |
| 5,515,479 | 5/1996 | Klassen | 395/109 |

*Primary Examiner*—Kim Vu
*Assistant Examiner*—Tia M. Harris
*Attorney, Agent, or Firm*—Greenblum & Bernstein P.L.C.

[57] ABSTRACT

A thermal printer for forming an image on a sheet, with the image having a plurality of line image data. The thermal printer includes a thermal head having a plurality of linearly arranged thermal elements for forming the image. The total number of the thermal elements to be driven is determined. The thermal elements are driven for a predetermined time period in accordance with the line image data if the number of thermal elements to be driven is not greater than a predetermined value. If the total number of the thermal elements to be driven is greater than the predetermined value, then the predetermined time period is divided into a number of fractional time periods and the thermal elements are intermittently driven for each of the fractional time periods. The predetermined value is determined to avoid sticking between the thermal head and a thermosensitive sheet due to excess heat.

21 Claims, 7 Drawing Sheets

FIG. 4A CLK
FIG. 4B DATA1
FIG. 4C DATA2
FIG. 4D $\overline{STB1}$
FIG. 4E $\overline{STB2}$
FIG. 4F $\overline{STB3}$
FIG. 4G $\overline{STB4}$
FIG. 4H A
FIG. 4I $\overline{A}$
FIG. 4J B
FIG. 4K $\overline{B}$

THERMAL PRINTER AND THERMAL PRINTER HEAD DRIVING SYSTEM

BACKGROUND OF THE INVENTION

The present invention relates to a thermal printer which performs an imaging operation by energizing linearly arranged thermal elements of a printing head.

Conventionally, thermal printers have a printing head with linearly arranged thermal elements energized to form an image on a thermosensitive paper. Generally, the thermal elements are divided into a plurality of groups, with each group of thermal elements being energized separately. By feeding the thermosensitive paper of a predetermined speed, and energizing each group of thermal elements at predetermined time intervals, a two-dimensional image is formed on the paper.

In this type of thermal printer, if one group of thermal elements has a high printing ration (i.e., a large number of the thermal elements are to be energized), then a sticking phenomenon may occur. The sticking phenomenon is a condition where the thermosensitive paper sticks to the thermal head as a result of a large number of the thermal elements being energized. When sticking occurs, the portion of the image having a high printing ratio becomes too dark. Further, of the paper feeds unevenly and the printed image has an uneven thickness.

SUMMARY OF THE INVENTION

It is therefore an object of the present invention to provide an improved thermal printer prevents the sticking of the thermosensitive paper to the thermal head even when the printing ratio is high.

According to an aspect of the present invention, there is provided a thermal printer for forming an image on a sheet, with the image having line image data. The thermal printer includes a thermal head having a plurality of linearly arranged thermal elements for forming the image. The total number of the thermal elements to be driven is determined. The thermal elements are driven for a predetermined time period in accordance with the line image data if the number of thermal elements to be driven is not greater than a predetermined value. If the total number of the thermal elements to be driven is greater than the predetermined value, then the predetermined time period is divided into a number of fractional time periods. The thermal elements are then driven intermittently for each of the fractional time periods.

The total number of thermal elements to be driven corresponds to a printing ratio of the line image to be formed. The printing ratio can be determined from the image data, which is stored in a memory. The image data is a bit map image, composed of black and white dots. The black dots are formed on the thermosensitive paper by driving one of the thermal elements to produce heat. Therefore, the printing ratio of the line to be printed is the ratio of the total number of black dots to be printed on the line to the total number of dots on the line.

Optionally, the thermal head may be driven by a strobe pulse, with the predetermined time period in which the thermal head is driven corresponding to a width of the strobe pulse. Further, the thermal elements are driven in accordance with the pulse width of the strobe pulse.

Further optionally, the fractional time period includes a compensation value for compensating the driving of the thermal elements, when the thermal elements are driven for the fractional time period. The compensation value compensates for the heat energy lost due to the intermittent driving of the thermal elements. By including the compensation value, the line image produced by the intermittent driving of the thermal elements will have a uniform darkness when compared with the other line images formed.

Alternatively, the thermal elements are arranged in a plurality of groups, with each of the groups of thermal elements being alternately driven for each of the fractional time periods.

In a preferred embodiment, the compensation value, and the number of fractional time periods are constants regardless of the total number of thermal elements to be driven.

In another embodiment, the number of fractional time periods is a function of the total number of thermal elements to be driven, and the compensation value is a function of the number of fractional time periods.

According to another aspect of the present invention, there is provided a method for forming an image on a sheet by driving a thermal head having a plurality of linearly arranged thermal elements, with the image having a plurality of lines. The method includes the steps of determining a total number of the thermal elements to be driven. The predetermined time period is divided into a number of fractional time periods, if the total number of the thermal elements to be driven is greater than the predetermined value. The thermal elements are driven for a predetermined time period, if the total number of the thermal elements to be driven are not greater than a predetermined value. The thermal elements are driven intermittently for each of the fractional time periods, if the total number of the thermal elements to be driven is greater than the predetermined value.

According to a further aspect of the present invention, there is provided a thermal printer for forming an image on a sheet in accordance with image data. The thermal printer includes a thermal head having a plurality of linearly arranged thermal elements for applying heat to the sheet. A mechanism drives the thermal elements to apply the heat. Another mechanism determines a total number of the thermal elements to be driven. The driving mechanism is controlled to drive the thermal elements continuously such that a predetermined amount of energy is applied to the sheet if the total number of the thermal elements to be driven is less than or equal to a predetermined value. Further, the driving mechanism is controlled to drive the thermal elements intermittently until the predetermined amount of energy is applied to the sheet if the total number of the thermal elements to be driven is greater than the predetermined value.

In the preferred embodiment, the image is formed on a thermosensitive sheet.

According to a still further aspect of the present invention, there is provided a thermal printer for forming an image on a sheet, with the image consisting of a plurality of line images. The thermal printer includes a thermal head having a plurality of linearly arranged thermal elements for forming the line image. A for determining mechanism drives a total number of the thermal elements to be driven to form at least a portion of the line image. A driving mechanism drives the thermal elements continuously to form at least the portion of the line image if the total number of the thermal elements to be driven is not greater than a predetermined value. Further, the driving mechanism drives the thermal elements intermittently to form at least the portion of the line image if the total number of the thermal elements to be driven is greater than the predetermined value.

BRIEF DESCRIPTION OF THE DRAWINGS

FIGS. 5Aa, 5Ab, 5Ac, and 5Ad show an expanded view of the timing diagram shown in FIGS. 4A, 4B, 4C, 4D, 4E, 4F, 4G, 4H, 4I, 4J, and 4K;

FIGS. 5Ba, 5Bb, 5Bc, and 5Bd show the timing diagram of the printing operation of the thermal printer when a printing ration of the line image to be printed is greater than a predetermined amount;

DESCRIPTION OF THE EMBODIMENTS

Figure 1:
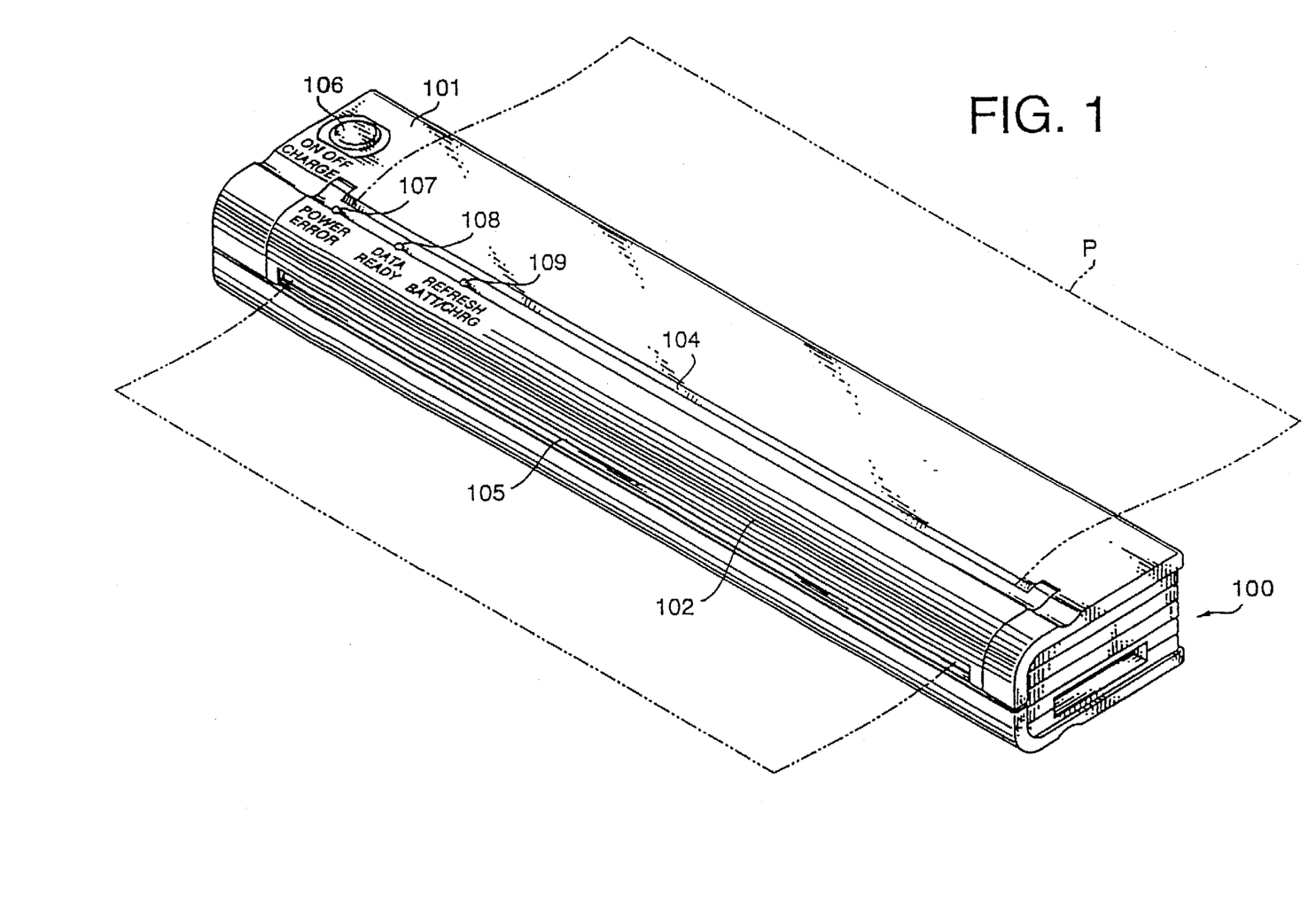
FIG. 1 shows a perspective view of a thermal printer embodying the present invention.

FIG. 1 is a perspective view of a thermal printer 100 embodying the mode control system according to the present invention. The thermal printer 100 has a main housing 101, and a platen roller cover 102. The platen roller cover 102 is hinged, and can swing to expose a platen roller (not shown).

Three indicators 107, 108 and 109 are formed on a top surface of the platen roller cover 102. In this embodiment, the three indicators 107, 108 and 109 are LEDs. The indicator 107 indicates whether the power is ON or OFF. The indicator 108 indicates whether data is being received. The indicator 109 indicates information about the operation of a built-in battery (not shown in FIG. 1), such as whether the built-in battery is being refreshed (i.e., completely discharged) or charged.

Paper for use with the thermal printer 100 is fed into a slot 104 formed between the platen roller cover 102 and the housing 101. An image is formed on the paper using a thermal printing head 40 (see FIG. 2). The paper then exits the thermal printer 100 through a slot 105, formed between the platen roller cover 102 and the housing 101.

A mode switch 106 is located on the top surface of the housing 101. The mode switch 106 is a push button switch and is normally open. By pressing the mode switch 106, various modes of operation of the thermal printer 100 are selected. In the present embodiment, the mode switch 106 also turns the power ON and OFF.

Figure 2:
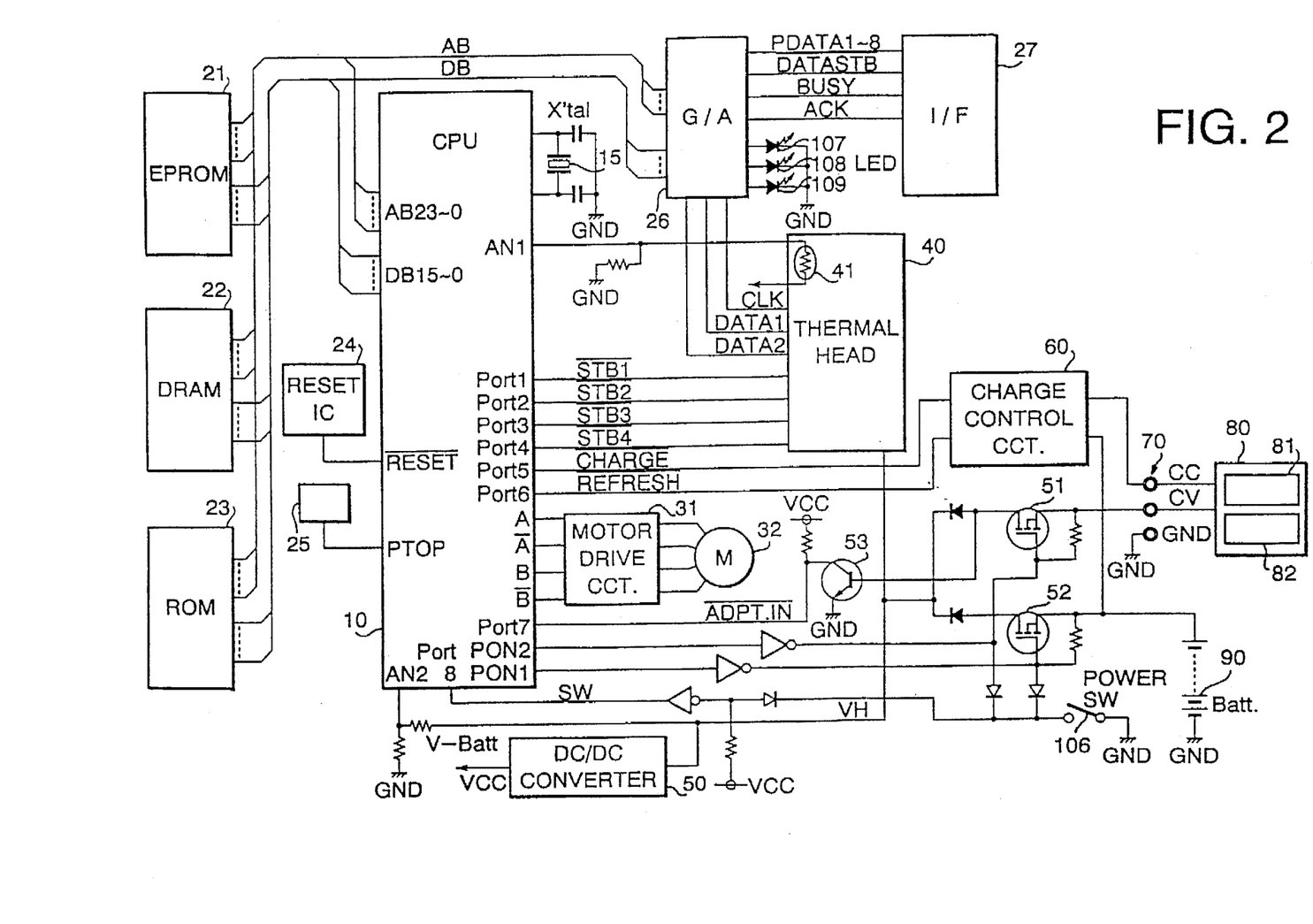
FIG. 2 shows a schematic diagram of the thermal printer shown in FIG. 1.

FIG. 2 is a schematic diagram of the thermal printer 100 shown in FIG. 1.

A CPU 10 controls an operation of the thermal printer 100. In the present embodiment, the CPU 10 is a microprocessor which can address up to 16 MB (megabytes). The CPU 10 transmits address information from address ports AB0 through AB23, along an address bus AB. The CPU 10 transmits and receives data through data ports DB0 through DB15 and a data bus DB. The CPU 10 connects to an EPROM 21, a DRAM 22, a font ROM 23, and a gate array 26, via the address bus AB and data bus DB.

Printer EPROM 21 stores data as well as software than control the performance, and an initial operation of the thermal printer 100 when the power is turned ON. The DRAM 22 (dynamic RAM) has an area where a bit-map of the image is developed, an area for storing data transmitted through an interface 27, and some other work areas. The font ROM 23 stores font data used for developing the bit-mapped image stored in the DRAM 22.

The CPU 10 uses a gate array 26 to exchange data through the interface 27, and drive the indicators 107, 108 and 109.

The interface 27 is a printer interface (e.g. Centronics interface) which receives print data and control data from a host computer (not shown). The printer interface has eight data lines PDATA 1 through PDATA 8, and three control lines $\overline{DATASTB}$, BUSY, and ACK. The eight data lines PDATA 1 through PDATA 8 are used to transfer the print data from the host computer. The $\overline{DATASTB}$ control line inputs data to the printer 100 from the host computer. The BUSY control line indicates that the printer 100 cannot accept the print data, while the ACK control line acknowledges reception of the print data. In the specification, a control line, port or signal having a "bar" over its name indicates an active low control line, port or signal, respectively.

A divided voltage $V_{13}$ BATT of the built-in battery 90 (or an external DC voltage) is applied to an analog port AN2 of the CPU 10. The CPU 10 A/D converts the applied analog voltage to a digital value, and detects the voltage of the built-in battery 90 (or external DC source).

A reset IC 24 transmits a reset signal ($\overline{RESET}$) to a CPU port $\overline{RESET}$, when the detected voltage level of the battery 90 is lower than a predetermined voltage level. When the $\overline{RESET}$ signal is LOW, the CPU 10 stops operation of the printer 100. Therefore, the printing operation stops when the voltage of the built-in battery 90 (or external DC voltage) is below the predetermined level.

A sensor 25, is mounted on the platen roller cover 102, detects the presence of the thermosensitive paper in a sheet feed path of the printer 100. If the thermosensitive paper is located in the sheet feed path, the sensor 25 transmits a paper-detect signal to a port PTOP of the CPU 10. By monitoring the port PTOP, the CPU 10 determines whether the printer 100 has thermosensitive paper loaded in the sheet feed path, and therefore whether the printer 100 is ready to start the printing operation.

A reference clock signal CLK is generated by crystal 15. In accordance with the reference clock signal CLK, the bit map of the print data is developed in the DRAM 22. The data written in the DRAM 22 is transmitted to the gate array 26 and synchronized with the reference clock signal CLK, before being transferred to the thermal print head 40. The data transferred to the thermal head 40 is separated into two separate data blocks: DATA1 and DATA2.

The thermal print head 40 has a plurality of thermal elements. The heat energy generated by each of the thermal elements is controlled by strobe signals $\overline{STB1}$, $\overline{STB2}$, $\overline{STB3}$, $\overline{STB4}$ (described later), which are transmitted from the ports Port 1 through Port 4 of the CPU 10. Thus, DATA1 and DATA2 identify the thermal elements to be driven, and strobe signals $\overline{STB1}$ through $\overline{STB4}$ drive the identified thermal elements to generate the required heat energy for printing the image.

A thermistor 41 is provided on the thermal head 40 for detecting the temperature of the thermal head 40. The output of the thermistor 41 is input to a port AN1 of the CPU 10. The CPU 10 A/D converts the signal input to the port AN1, and detects the temperature of the thermal head 40.

A motor driving signal is transmitted from ports A, $\overline{A}$, B, $\overline{B}$, for controlling a motor driving circuit 31. The motor driving circuit 31 drives a motor 32. The motor driving circuits 31 will be described in more detail later.

A port PON1 outputs a signal for turning ON or OFF a FET 52. A port PON2 outputs a signal for turning ON or OFF a FET 51. If an external power source (such as an AC adapter) is used to power the printer 100, a transistor 3 is turned ON thereby changing the signal $\overline{\text{ADPT.IN}}$ from High to Low. The CPU 10 monitors the $\overline{\text{ADPT.IN}}$ signal at Port 7, and determines whether the external power supply is connected. If the external power supply is connected (i.e., $\overline{\text{ADPT.IN}}$ is Low), then the CPU 10 drives the FET 51 through port PON2. If the external power supply is not connected (i.e., $\overline{\text{ADPT.IN}}$ is High), then the CPU 10 drives the FET 52 through port PON1.

When the switch 106 is first turned ON, the FET 51 or 52 is turned ON, as described above. Power is supplied from the external power source or the built-in battery to a DC/DC converter 50. The DC/DC converter 50 outputs Vcc which powers the CPU 10, the EPROM 21, the DRAM 22 and the ROM 23. In this embodiment, Vcc=5 V.

When the FETs 51 and 52 are turned OFF by the signals output from the Ports PON1 and PON2, power is not supplied to the DC/DC converter 50. Therefore, the power to the CPU 10 is cut-off and the printer 100 is turned OFF. To turn the printer 100 ON, it is necessary to press the switch 106 again, thereby providing power to the FETs 51 and 52.

The built-in battery 90 is a rechargeable battery, such as a Nickel Cadmium battery. The battery 90 supplies 14.4 VDC to the printer 100. A power source connector 70 is provided to connect the external power source, such as an AC adapter 80, to the printer 100. The AC adapter 80 includes a constant current source 81 and a constant voltage source 82. An output of the constant current source 81 is connected to a battery charge control circuit 60, and is used to recharge the battery 90. An output of the constant voltage source 82, is connected to an input of the DC/DC converter 50.

As described above, the constant current source 81 is part of the AC adapter 80, and not in the printer 100, since the constant current source 81 is only required for charging the battery. Therefore, the size and weight of the printer 100 is reduced.

To maximize the efficiency of charging the battery 90, the battery 90 is first refreshed (completely discharged) before being recharged. This reduces the 'memory' effect of the battery 90. The memory effect of a battery occurs when the battery is recharged without first being fully discharged. That is, if the battery is repeatedly recharged without being fully discharged, the available battery capacity is reduced.

In the present embodiment, the refreshing of the battery 90 is controlled by the charging circuit 60. When the battery is to be refreshed, the CPU 10 transmits a $\overline{\text{REFRESH}}$ signal from the Port 6 to the charge control circuit 60. The charge control circuit 60 stops charging the battery 90. The FET 51 is turned OFF, and the FET 52 is turned ON. The FET 52 connects the battery 90 to a load (not shown) to refresh the battery 90.

In the present embodiment, the charging of the battery 90 is also controlled by the charging circuit 60. When the battery is to be charged, the CPU 10 transmits a $\overline{\text{CHARGE}}$ signal from the Port 5. The charge control circuit 60 starts charging the battery 90 using the constant current source 81 of the AC adapter 80. The voltage of the battery 90 is monitored by the CPU 10, to determine when to stop the charging operation.

The thermal head 40 has 2560 thermal elements arranged along a line, having a length equivalent to a width of one sheet of the thermosensitive paper used in the printer 100. Print data for the first through the 1280st thermal element are grouped as the DATA1,, while print data for the 1281st through the 2560th thermal elements are grouped as the DATA2. Further, as described above, the data DATA1 and DATA2 are transferred to the thermal head 40 synchronously with the reference clock signal CLK.

The thermal elements are divided into four groups, with each group driven by the strobe signals $\overline{\text{STB1}}$, $\overline{\text{STB2}}$, $\overline{\text{STB3}}$, and $\overline{\text{STB4}}$, respectively. With this arrangement, the number of thermal elements driven at one time may be varied in accordance with the power available form the battery 90. If the power available from the battery 90 is low, then each groups of thermal elements may be driven sequentially. However, if the battery 90 is fully charged, or if the AC adapter 80 is used, all four groups of thermal elements may be driven simultaneously.

Figure 3:
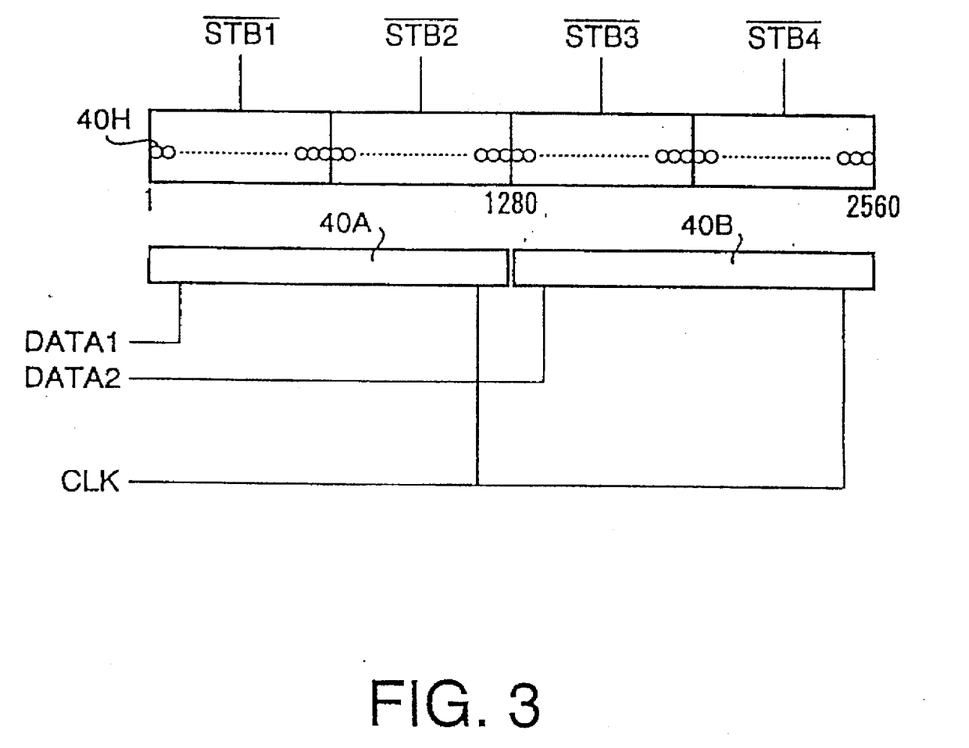
FIG. 3 shows a structure of a thermal head of the thermal printer shown in FIG. 1.

FIG. 3 illustrates a structure of the thermal head 40. Data used to drive the first through 1280th thermal elements 40H is sent from the CPU 10 to the shift register 40A synchronously with the clock signal CLK. Similarly, data used to drive the 1281st through 2560th thermal elements 40H is sent from the CPU 10 to the shift register 40B synchronously with the clock signal CLK. Each bit of the shift registers 40A and 40B store data which drives one of the thermal elements 40H. If the data value of the bit stored in the shift register is "1", then the corresponding thermal element is driven (i.e., turned ON) when the strobe signal $\overline{\text{STBn}}$ is LOW.

FIGS. 4A, 4B, 4C, 4D, 4E, 4F, 4G, 4H, 4I, 4J, and 4K are timing diagrams showing the transfer of data to the thermal head 40, the driving of the thermal head 40 and of the motor 32.

After a bit map has been developed in the DRAM 22, the data to be printed by the thermal elements 40H is transmitted from the gate array 26 to the shift registers 40A and 40B. Initially DATA1 is transmitted synchronously with the clock signal CLK, and stored in the shift register 40A. After DATA1 has been stored, the strobe signals $\overline{\text{STB1}}$ and $\overline{\text{STB2}}$ are made LOW for a predetermined time interval to drive the first through 1280th thermal elements 40H. Simultaneously, the motor 32 is driven to feed the thermal sheet a predetermined amount.

When the strobe signals $\overline{\text{STB1}}$ and $\overline{\text{STB2}}$ are LOW, DATA2 is transmitted synchronously during time interval TSTB, and stored in the shift register 40B. Therefore, after driving the strobe signals $\overline{\text{STB1}}$ and $\overline{\text{STB2}}$, DATA2, which has been stored in shift register 40B, is transferred to the respective thermal elements 40H. Thus, during the next time interval TSTB, the strobe signals $\overline{\text{STB3}}$ and $\overline{\text{STB4}}$ are tied LOW, and the 1281st through 2560th thermal elements 40H are driven. Further, during the next time interval TSTB, DATA1 for the next line is transferred to the shift register 40A, and the above process repeats. Subsequent lines are printed in a similar manner.

Figures 4A, 4B:
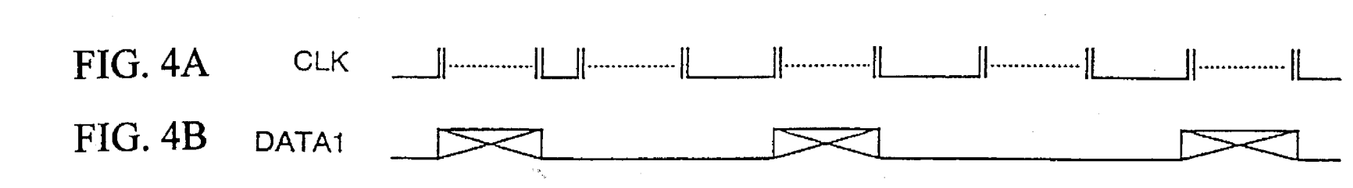
FIGS. 4A, 4B, 4C, 4D, 4E, 4F, 4G, 4H, 4I, 4J, and 4K are timing diagrams of the control of the thermal head and motor.
Figure 4C:
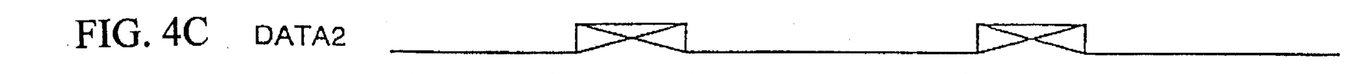
Figure 4D:
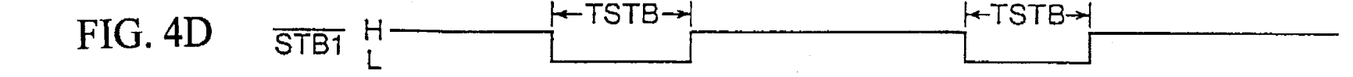
Figure 4E:
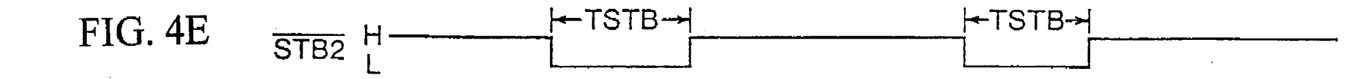
Figure 4F:
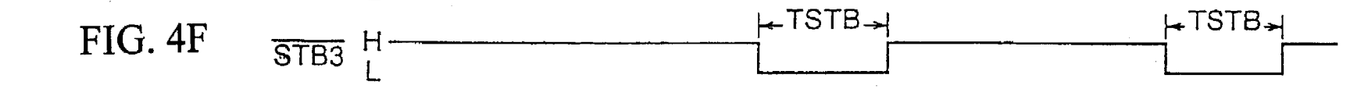
Figure 4G:
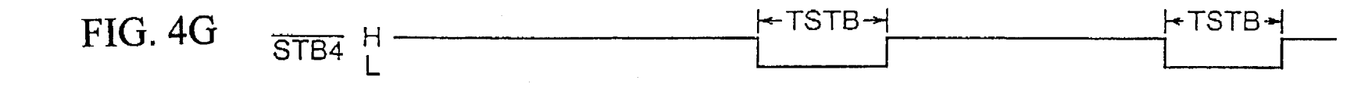
Figure 4H:
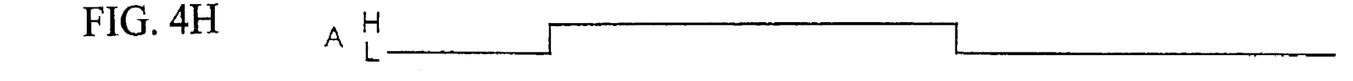
Figure 4I:
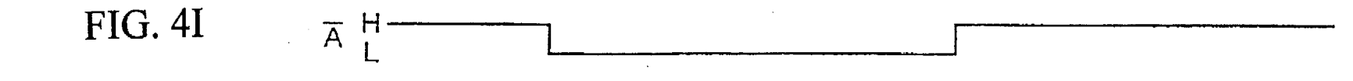
Figure 4J:
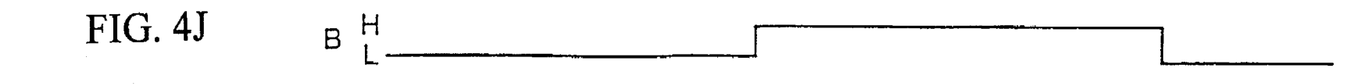
Figure 4K:
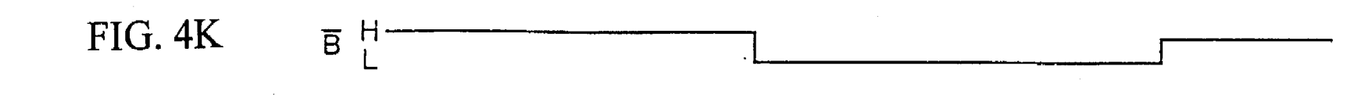

In the present embodiment, a two phase exciting method is used to drive the motor 32. Motor driving pulses A, $\overline{\text{A}}$, B, and $\overline{\text{B}}$ are sent from the CPU 10 to the motor 32 in one of two states, HIGH or LOW. Initially the states of the motor driving pulses are as follows: A=LOW, $\overline{\text{A}}$=HIGH, B=LOW, and $\overline{\text{B}}$=HIGH. Then when the states of two of the motor driving pulses (i.e., A and $\overline{\text{A}}$) are changed, the motor 32 feeds the thermal printer half a line. As shown in FIGS. 4H and 4I, the states of driving pulses A and $\overline{\text{A}}$ are changed while the strobe signals $\overline{\text{STB1}}$ and $\overline{\text{STB2}}$ are LOW. Then, while the strobe signals $\overline{\text{STB3}}$ and $\overline{\text{STB4}}$ are LOW, the states of motor driving pulses B and $\overline{\text{B}}$ are changed, and the motor 32 feeds the thermal paper another half line. The thermal printer is then ready to accept the next set of data to be printed. If the data to be printed (i.e., DATA1 or DATA2) has a low printing ratio (i.e., the ratio of the number of which will print the data thermal elements to total number of printing elements) then the thermal elements 40H can be driven as described above. However, in case DATA1 or DATA2 has a high printing ration, the driving of the strobe signals $\overline{STB1}$, $\overline{STB2}$, $\overline{STB3}$, and $\overline{STB4}$ is modified as described below.

Figure 5A:
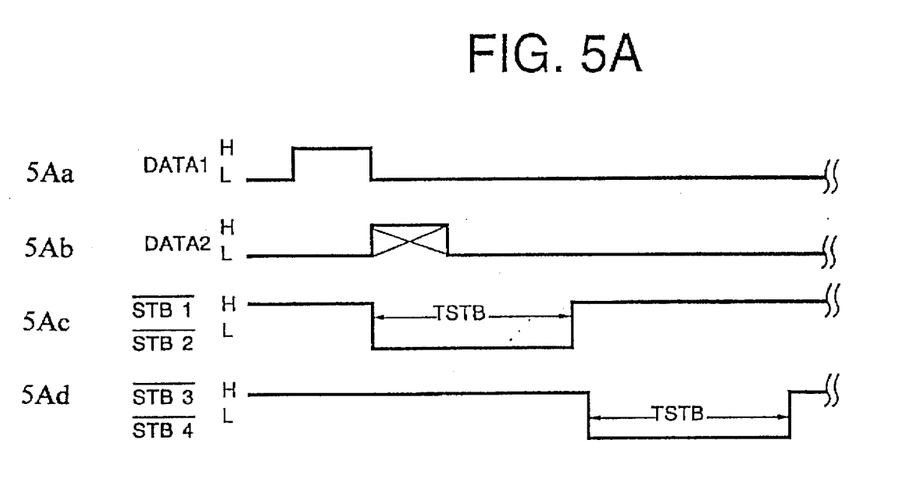
Figure 5B:
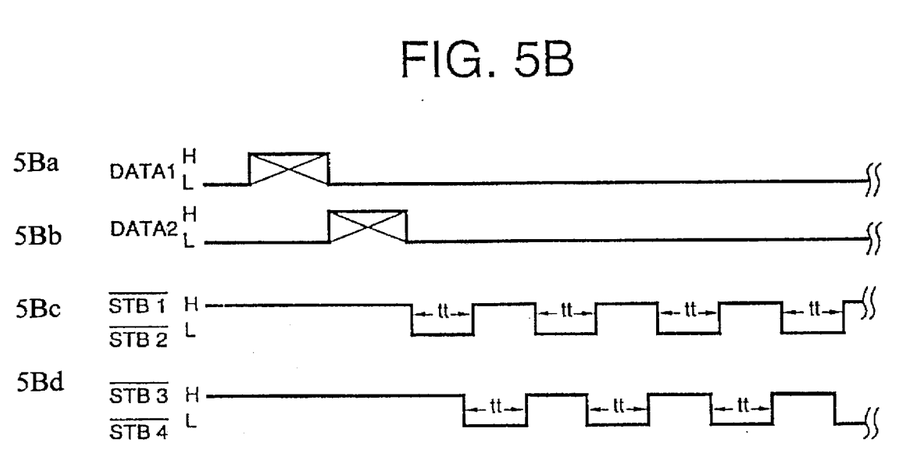

FIGS. 5Aa, 5Ab, 5Ac, 5Ad and FIGS. 5Ba, 5Bb, 5Bc, 5Bd show timing charts of the printing operation of the thermal printer embodying the present invention. FIGS. 5Aa, 5Ab, 5Ac, and 5Ad show the normal printing operation (i.e., when the printing ratio is low), while 5Ba, 5Bb, 5Bc and 5Bd show an intermittent printing operation, which is executed when the printing ratio is high.

As shown in FIGS. 5Aa, 5Ab, 5Ac and 5Ad, if the printing ratio is low, the strobe signals $\overline{STB1}$ and $\overline{STB2}$ are tied LOW for the time interval TSTB. Then, the strobe signals $\overline{STB3}$ and $\overline{STB4}$ are tied LOW for the next time interval TSTB.

As shown in FIGS. 5Ba, 5Bb, 5Bc and 5Bd, if the printing ratio is high, the strobe signals $\overline{STB1}$ and $\overline{STB2}$ are tied LOW for a time interval tt, followed by the strobe signals $\overline{STB3}$ and $\overline{STB4}$ being tied LOW for a subsequent time interval tt. The alternating pattern repeats until the transfer of the image has been completed for the first line of data. The data for the next line is then transferred to the registers 40A and 40B.

As described above, by intermittently driving the thermal elements, the sticking phenomenon is avoided, since the heat energy is intermittently applied to the thermosensitive paper.

Figure 6:
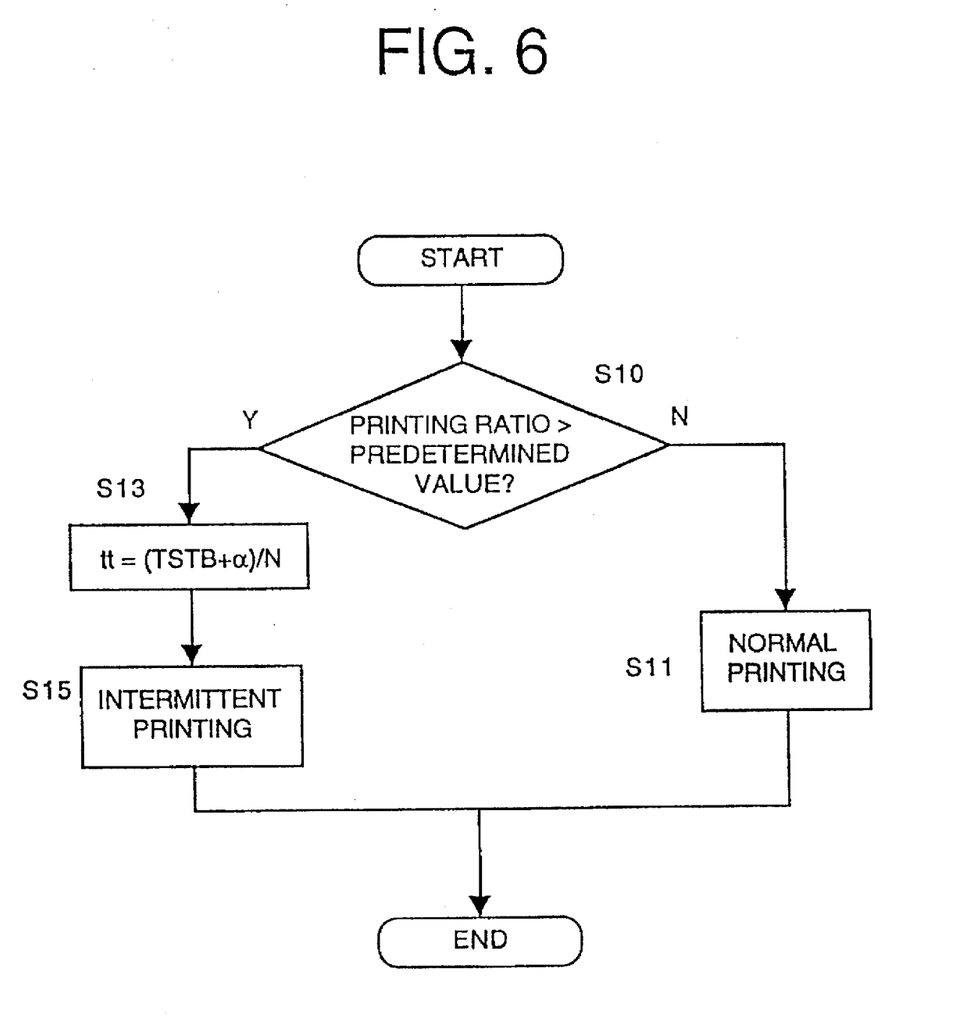
FIG. 6 shows a flowchart of a printing operation of the thermal printer according to an embodiment of the present invention.

FIG. 6 shows a flowchart of the printing of one line of data on the thermosensitive paper. In this embodiment, the printing ratio is a ratio of the number of thermal elements to be driven to the total number of thermal elements 40H. The number of thermal elements to be driven is determined by counting the number of 1's (one—representing black dots) in the data stored in the shift register 40A or 40B. The printing ratio is the ratio of the number of thermal elements to be driven (black dots to be formed) to the total number of thermal elements 40H (total number of black dots that can be formed).

Initially, the printing ratio is compared with a predetermined reference value in step S10. If the printing ratio is less than or equal to the predetermined value (S10:N), then normal printing is executed in step S11.

If the printing ratio is greater than the predetermined value, the time interval tt is determined from the equation:

$$tt=(TSTB+\alpha)/N$$

where: $\alpha$ is a constant for compensating the loss of heat due to the intermittent driving of the thermal elements.

TSTB is the time interval for driving the thermal elements when the printing ratio is less than the predetermined value (i.e., the time interval required to generate a sufficient amount of heat when the thermal elements are driven continuously), and N is the number of division so the strobe pulse to be driven.

Experiments have shown that if N≧4 the sticking phenomenon is prevented.

Then in step S15, the thermal elements driven by the strobe signals $\overline{STB1}$ and $\overline{STB2}$ are intermittently driven for a time tt followed by the thermal elements driven by the strobe signals $\overline{STB3}$ and $\overline{STB4}$, as described above.

Thus, by dividing the thermal elements into a plurality of groups, and alternately driving these groups of thermal elements, the sticking phenomenon is avoided.

Figure 7:
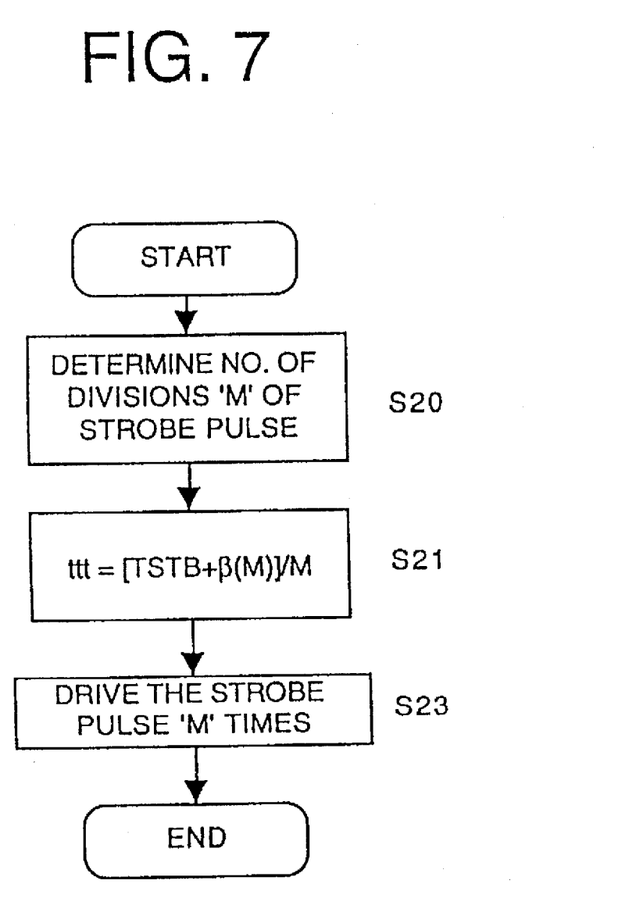
FIG. 7 shows a flowchart of a printing operation of the thermal printer according to another embodiment of the present invention.

FIG. 7 shows a flowchart of a second embodiment of the present invention. In this embodiment, the number of divisions M of the strobe pule is determined in accordance with the printing ratio.

Initially, the number of groups of thermal elements is determined in step S20. The number of groups of thermal elements can be determined, for example, from a ROM look up table.

Then in step S21, the width ttt of the strobe pulse is determined in accordance with the following equation:

$$ttt=\{TSTB+\beta(M)\}/M$$

where: $\beta(M)$ is a value for compensating the loss of heat energy due to the intermittent driving of the thermal elements. In this second embodiment, the compensation value $\beta a(M)$ is a function of the number of divisions M of the strobe pulse, and is given by the following equations:

$\beta(M)=0$, when M=1; and $\beta(M)=aM^2+bM$, when M>1, where a and b are constant coefficients.

In step S23, each group of thermal elements is alternately energized for the time interval ttt. If M=1, then the normal printing operation is executed.

In the above described operation, the first intermittent energization of the first group of thermal elements (and therefore the driving of the strobe signals $\overline{STB1}$ and $\overline{STB2}$) is executed after DATA1 is transmitted. Similarly, the first intermittent energization of the second group of thermal elements (and therefore the driving of the strobe signals $\overline{STB3}$ and $\overline{STB4}$) is executed after DATA2 is transmitted.

Further, in the second embodiment, the number of divisions M of the strobe pulse is determined based on the printing ratio. However, the number of groups may be fixed at a constant value which will overcome the sticking phenomenon regardless of the printing ratio.

In the second embodiment, when M is greater than 1, $\beta(M)$ is given by a second order equation. However a third or higher order equation may be used, depending on the characteristics of the thermal printer.

The present disclosure relates to subject matter contained in Japanese Patent Application No. HEI 6-150304 filed on Jun. 8, 1994 which is expressly incorporated herein by reference in its entirety.

What is claimed is:

1. A thermal printer for forming an image on a sheet, said image having a plurality of line image data, said thermal printer comprising:

a thermal head having a plurality of linearly arranged thermal elements for forming said image;

means for driving said thermal elements for a predetermined time period in accordance with said line image data;

means for determining a total number of said thermal elements to be driven;

means for dividing said predetermined time period into a number of fractional time periods, if said total number of said thermal elements to be driven is greater than a predetermined value, said fractional time periods including a compensation value for compensating said driving of said thermal elements; and means for controlling said driving means to intermittently drive each of said thermal elements to be driven for each of said fractional time periods, if said total number of said thermal elements to be driven is greater than said predetermined value.

2. The thermal printer according to claim 1, wherein said total number of said thermal elements to be driven determined by said determining means corresponds to a printing ratio of said line image to be printed.

3. The thermal printer according to claim 1, wherein said predetermined time period corresponds to a width of a strobe pulse, and wherein said thermal elements are driven in accordance with said width of said strobe pulse of a corresponding strobe signal.

4. The thermal printer according to claim 1, wherein said compensation value is a constant, and wherein a number of said fractional time periods is a constant regardless of said total number of thermal elements to be driven.

5. The thermal printer according to claim 1, wherein said number of said fractional time periods is a function of said total number of thermal elements to be driven, and wherein said compensation value is a function of said number of fractional time periods.

6. The thermal printer according to claim 1, wherein said thermal elements are arranged in a plurality of groups, wherein said driving means alternately drives each of said plurality of groups of said thermal elements for each of said fractional time periods.

7. A method for forming an image on a sheet by driving a thermal head having a plurality of linearly arranged thermal elements, said image having a plurality of lines, said method comprising:

determining a total number of said thermal elements to be driven;

dividing a predetermined time period into a number of fractional time periods, if said total number of said thermal elements to be driven is greater than a predetermined value; driving said thermal elements for said predetermined time period, if said number of thermal elements to be driven is not greater than a predetermined value, and intermittently driving each of said thermal elements to be driven for each of said fractional time periods, if said total number of said thermal elements to be driven is greater than said predetermined value; and compensating said fractional time periods with a compensation value.

8. The method according to claim 7, wherein said compensation value is a constant, and wherein said number of fractional time periods is a constant regardless of said total number of said thermal elements to be driven.

9. The method according to claim 7, wherein said number of fractional time periods is a function of said total number of said thermal elements to be driven, and wherein said compensation value is a function of said number of fractional time periods.

10. The thermal printer according to claim 7, wherein said thermal elements are arranged in a plurality of groups wherein said driving step alternately drives each of said plurality of groups of said thermal elements for each of said fractional time periods.

11. A thermal printer for forming an image on a sheet in accordance with image data, comprising:

a thermal head having a plurality of linearly arranged thermal elements for applying heat to said sheet;

means for driving said thermal elements to apply heat;

means for determining a total number of said thermal elements to be driven;

means for controlling said driving means to continuously drive each of said thermal elements to be driven such that a predetermined amount of energy is applied to said sheet, if said total number of said thermal elements to be driven is less than or equal to a predetermined value, and for controlling said driving means to intermittently drive each of said thermal elements to be driven until said predetermined amount of energy is applied to said sheet if said total number of said thermal elements to be driven is greater than said predetermined value; and means for compensating a total time period during which said thermal elements are driven if said thermal elements are driven intermittently.

12. The thermal printer according to claim 11, wherein said sheet is a thermosensitive sheet.

13. A thermal printer for forming an image on a sheet, said image consisting of a plurality of line images, said thermal printer comprising:

a thermal head having a plurality of linearly arranged thermal element for forming said line image;

means for determining a total number of thermal elements to be driven to form at least a portion of said line image;

means for driving said thermal elements; and means for compensating a total time period during which said thermal elements are driven if said thermal elements are driven intermittently to form said at least a portion of said line image, wherein said driving means continuously drives each of said thermal elements to be driven to form said at least a portion of said image, if said total number of said thermal elements to be driven is not greater than a predetermined value, and wherein said driving means intermittently drives each of said thermal elements to be driven to form said at least a portion of said line image, if said total number of said thermal elements to be driven is greater than said predetermined value.

14. The thermal printer of claim 1, each of said thermal elements to be driven producing a single dot after being driven for said number of fractional time periods.

15. The method of claim 7, each of said thermal elements to be driven producing a single dot after being driven for said number of fractional time periods.

16. The thermal printer of claim 11, wherein each of said thermal elements to be driven produces a single dot after said predetermined amount of energy is applied to said sheet.

17. The thermal printer of claim 13, wherein each of said thermal elements to be driven produces a single dot after being driven intermittently plural times.

18. The thermal printer of claim 1, wherein energy applied by each of said thermal elements to be driven over each of said number of fractional time periods is insufficient to cause paper to stick to said thermal head.

19. The thermal printer of claim 18, wherein each of said thermal elements to be driven produces a single dot after being driven for said number of fractional time periods.

20. The thermal printer of claim 11, wherein energy applied by each of said thermal elements during intermittent driving of each of said number of fractional time periods is insufficient to cause paper to stick to said thermal head.

21. The thermal printer of claim 20, each of said thermal elements to be driven producing a single dot after being driven for said number of fractional time periods.

* * * * *